Figure 1:
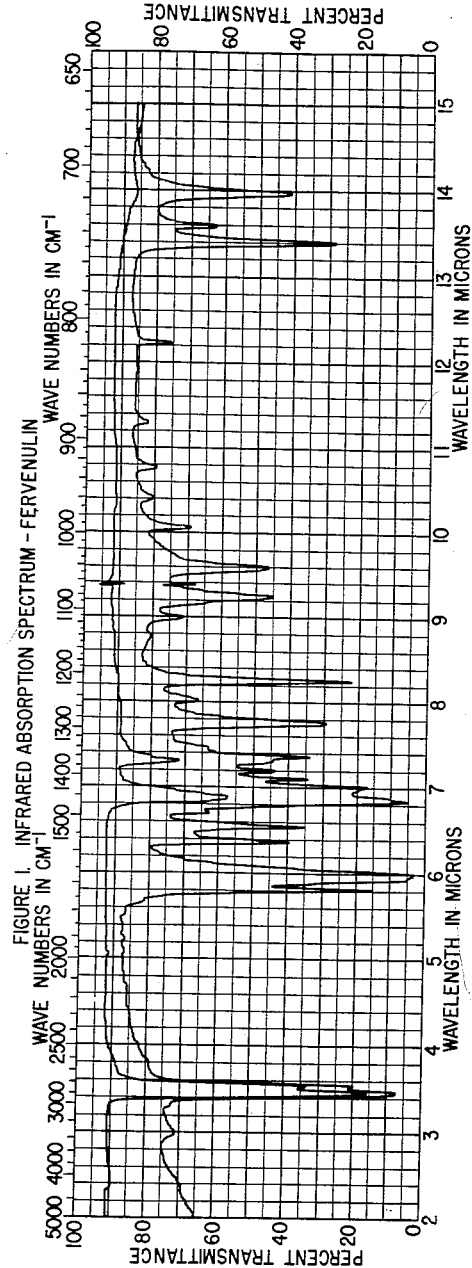

Feb. 20, 1962  C. DE BOER ET AL  3,022,220
FERVENULIN AND ITS PRODUCTION
Filed March 25, 1959  2 Sheets-Sheet 1

CLARENCE DEBOER
THOMAS E. EBLE
CHARLES M. LARGE
*INVENTORS*

BY EUGENE O. RETTER
GEORGE T. JOHANNESEN
*ATTORNEYS*

ULTRAVIOLET SPECTRUM – FERVENULIN

3,022,220
FERVENULIN AND ITS PRODUCTION

Clarence De Boer, Kalamazoo Township, Kalamazoo County, and Thomas E. Eble and Charles M. Large, Kalamazoo, Mich., assignors to The Upjohn Company, Kalamazoo, Mich., a corporation of Delaware
Filed Mar. 25, 1959, Ser. No. 801,876
9 Claims. (Cl. 167—65)

This invention relates to a novel composition of matter and to the process for the production thereof. More particularly this invention relates to a new compound, fervenulin (compound *a*–11) and to the process for the production thereof.

Fervenulin is obtained as an elaboration product of a novel species of Streptomyces and has the property of adversely affecting the growth of various organisms, particularly protozoa, bacteria, and fungi.

As the essential ingredient of a composition, it is useful to prevent or reduce the number of organisms or the possibility of transmission of pathogenic organisms. For example, wash solutions containing fervenulin are useful for general sanitation purposes, for example: washing of hands, cleaning of equipment, floors or furnishings of contaminated rooms or laboratories. Its use is indicated as an additive for tuberculosis room and instrument sterilization, for use in biological media, as an industrial preservative, for example, as a bacteriostatic rinse for laundered clothes and for impregnating to make bacteriostatic papers and fabrics, and also in teaching and research.

A viable culture of the new species, identified as *Streptomyces fervens,* has been deposited with the Fermentation Division, Northern Utilization Research Branch, U.S. Department of Agriculture, Peoria, Illinois, and has been added to its permanent collection as NRRL–2755.

*Streptomyces fervens* was isolated from a soil sample taken at Van Nuys, California. It is particularly characterized by pink to red vegetative growth and pink aerial growth; by an extremely course aerial mycelium; and by a sparse growth of monoverticillate or biverticillate sporophores. These morphological characteristics together with the cultural characteristics given below distinguish the organism as a new species.

In Table I, *Streptomyces fervens* is characterized according to its ability to utilize carbon compounds by the procedure of Pridham and Gottlieb [J. Bact. 56: 107–114 (1948)] with the modifications noted in the printed German patent application No. 1,025,893.

TABLE I
*Assimilation of carbon compounds in synthetic medium*

| Compound | S. fervens |
|---|---|
| Control | (−) |
| 1. d-Xylose | (−) |
| 2. l-Arabinose | (−) |
| 3. Rhamnose | (−) |
| 4. d-Fructose | (−) |
| 5. d-Galactose | (−) |
| 6. d-Glucose | + |
| 7. d-Mannose | + |
| 8. Maltose | + |
| 9. Sucrose | − |
| 10. Lactose | (−) |
| 11. Cellobiose | (−) |
| 12. Raffinose | − |
| 13. Dextrin | + |
| 14. Insulin | − |
| 15. Soluble starch | (+) |
| 16. Glycerol | + |
| 17. Dulcitol | + |
| 18. d-Mannitol | − |
| 19. d-Sorbitol | − |
| 20. Inositol | + |
| 21. Salicin | − |
| 22. Phenol | − |
| 23. Cresol | − |
| 24. Na formate | (−) |
| 25. Na oxalate | (−) |
| 26. Na tartrate | (−) |
| 27. Na salicylate | − |
| 28. Na acetate | − |
| 29. Na citrate | (+) |
| 30. Na succinate | (+) |

Key: +positive assimilation; −negative assimilation; (−) negative assimilation, but only slight growth; (+) positive assimilation, but only slight growth.

Other cultural and morphological characteristics of *Streptomyces fervens* as shown by the Dietz Ektachrome (positive color film transparencies) technique, Annals of the New York Academy of Science, vol. 60, Art. 1, pages 152–4, October 29, 1954, are noted in Table II.

TABLE II
*Characteristics of* Streptomyces fervens *by Ektachrome Technique*

| Medium | Observations | |
|---|---|---|
| | Surface | Reverse |
| Bennett's agar | Pink aerial growth | Red. |
| Czapek's sucrose agar | Trace pink aerial growth | Faint pink. |
| Maltose tryptone agar | Pink aerial growth | Red. |
| Peptone iron agar | Gray vegetative growth | Brown. |
| 0.1% tyrosine agar | Fair pink aerial growth | Pink-red. |
| Casein starch agar | do | Red. |

Further cultural characteristics of *S. fervens* are shown by its growth on fourteen different standard culture media at selected temperatures as shown in the following table:

TABLE III
*Cultural characteristics of* Streptomyces fervens *(14 days' incubation at 28° C.)*

| Medium | Surface | Reverse | Other |
|---|---|---|---|
| Peptone iron agar | No aerial growth, grey vegetative growth | Brown | H₂S darkening. |
| 0.1% tyrosine agar | Deep pink aerial growth | Pink | Fair-brown pigment. |
| Litmus milk | Ring at surface—brown on top, cream pink on bottom. Trace pink aerial growth. | | Pink-tan growth at base, slight tan pigment, nitrates reduced. |
| Synthetic nitrate broth | Pink surface pellicle, trace pink aerial growth | | Do. |
| Organic nitrate broth | Pink vegetative growth, ring at surface, no aerial growth. | | Flocculent growth at base, tan pigment, nitrates reduced. |
| Plain gelatin (12%) | | | Brown pigment, ½ liquefied. |
| Calcium malate agar | Trace pink aerial growth | Pink | No pigment. |
| Glucose asparagine agar | Firm pink aerial growth | do | Pale yellow pigment. |
| Skim milk agar | No aerial growth, pink vegetative growth | Pink-tan | No pigment, no hydrolysis. |
| Casein starch agar | Pink aerial growth | Pink | Slight tan, pigment, starch hydrolyzed. |
| Nutrient starch agar | Slight pink aerial growth | Red-pink | Tan pigment, starch hydrolyzed. |
| Bennett's agar at— | | | |
| 18°, 24°, and 28° C | Compact pink aerial growth | Red-orange | Slight-tan pigment. |
| 37° C | Trace maroon aerial growth | Maroon | Do. |
| Czapek's sucrose agar at— | | | |
| 18°, 20° C | Fair pink-white aerial growth | Pink-white | No pigment. |
| 28°, 37° C | Fair pink aerial growth | Pink | Do. |
| Maltose tryptone agar at— | | | |
| 18° C | Compact pink aerial growth | Red-orange | Slight-tan pigment. |
| 24° C | Peach-pink aerial growth | Red-brown | Do. |
| 37° C | Trace pink aerial growth | Maroon | Do. |

Fervenulin is produced when the particular strain of S. fervens characterized above is grown in an aqueous nutrient medium under submerged aerobic conditions, and preferably, in a nutrient medium containing a carbon source, such as an assimilable carbohydrate, and a nitrogen source, such as an assimilable nitrogen compound or a proteinaceous material. It is to be understood, however, that the invention also embraces other fervenulin-producing strains of S. fervens, such strains being readily produced and isolated by routinely applied isolation and strain modification methods which include selection of cultured organisms and exposure of these organisms to modifying means such as X-ray, ultraviolet light, chemical agents such as nitrogen mustards, and the like. It is to be understood also that for the preparation of limited amounts, shaken flasks and surface cultures in bottles can be employed. The presently preferred sources of carbohydrates include glucose, dextrose, sucrose, dextrin, molasses (black strap and high test or invert), corn meal (refined and unrefined), and starch (bolted and soluble), and combinations thereof. Other suitable carbon sources are maltose, lactose, galactose, glycerol, mannitol, soybean oil, animal and vegetable oils, and the like. Preferred sources of nitrogen include protein sources such as cotton seed meal, soybean meal, soya flour, fish meal, peanut meal, defatted soybean meal, peptone (meat, soya, egg, milk), and the like. Other suitable sources are milk proteins, brewer's yeast (dried yeast cells obtained from a beer fermentation) or yeast extract, corn gluten meal, corn steep liquor, fish stick liquor, animal stick liquor, distillers solubles, trypticase, tryptone, beef extract, N-Z amine A (an enzymatic hydrolysate of casein), N-Z amine B (a pancreatic digest of casein), N-Z amine E (a tryptic digest of casein), proteolyzed milk, meat, soya and egg products, amino acid mixtures, inorganic nitrogen as nitrate and ammonium salts and the like. Combinations of two or more of these nitrogen sources can be used advantageously.

Nutrient inorganic salts, for example, salts capable of yielding ions such as potassium, sodium, calcium, phosphate, chloride, sulfate, and the like, can be incorporated advantageously in the medium. Essential trace elements such as zinc, magnesium, manganese, cobalt, iron, and the like, can also be included in the culture medium for growing S. fervens. Such trace elements are commonly supplied as impurities incidental to the addition of the constituents of the medium.

The media used in the process of the invention can contain precursors, in addition to the nutrient components present therein, to obtain valuable products. For example, an assimilable source of cobalt can be included where cobalamines (vitamin $B_{12}$ and vitamin $B_{12}$-like products) are desired, and these by-products then recovered by conventional methods. Similarly, steroid precursors, such as progesterone or Reichstein's compound S or S acetate, can be added to obtain an oxidized steroid.

Suitable temperatures for the growth of S. fervens and for the production of fervenulin lie between about 18–37° C. The time required under suitable submerged aerobic fermentation conditions for optimum production of fervenulin is generally from 2–10 days. The culture medium, prior to inoculation with the microorganism, advantageously is adjusted to a pH between about 7.0 and about 8.0, and preferably to about pH 7.5. The medium normally stays alkaline during fermentation, the final pH being dependent, in part, on the initial pH of the culture medium, the buffers present, and the like.

When growth is carried out in large vessels and tanks, it is preferable to use the vegetable form of the microorganism for inoculation to avoid a pronounced lag in the production of fervenulin and the attendant inefficient utilization of the equipment. Accordingly, it is desirable first to produce a maltose tryptone agar slant which is inoculated with the material from a lyophilized culture or with an aliquot of a soil culture. A vegetative inoculum of the microorganism is then produced by inoculating a relatively small amount of culture medium with material scraped from the agar slant. When a young, active vegetative inoculum has thus been secured, it is transferred aseptically to large vessels or tanks. The medium in which the vegetative inoculum as produced can be the same as, or different from, that utilized for the production of fervenulin as long as it is such that a good growth of the organism is obtained.

The rate of production of fervenulin and the concentration of fervenulin in the culture medium are readily followed during the growth period of the microorganism by testing samples of the culture medium for antibacterial activity against an organism known to be susceptible to fervenulin e.g., Klebsiella pneumoniae, by standard agar diffusion or turbidimetric test procedures, by fractionating a sample by chromatography and measuring the zones located by a Cary spectrophotometer by their absorption at 239 mμ, or by extraction into methylene chloride at pH 6 followed by absorbance measurement at 342 mμ.

Fervenulin can be removed from the culture medium by adsorptive techniques including adsorption on carbon or like capillary adsorbent, and elution therefrom with a suitable eluting agent or by solvent extraction procedures.

According to a preferred procedure the whole beer is filtered, the fervenulin is extracted from the filtrate with a water-immiscible organic solvent such as a lower haloalkane like methylene chloride or chloroform, a lower alkyl alkanoate like ethyl or butyl acetate, a lower alkanone like butanone, or pentanone (either isomer), or a lower alkanol such as butanol (except t-butanol) or pentanol (all isomers). The fervenulin can be crystallized directly from the solvent extract by evaporation of the solvent, addition of a hydrocarbon solvent such as hexane, or evaporation of the solvent (to an oil or to dryness) plus crystallization from another solvent such as acetone, methanol, ethanol, and the like. Crude fervenulin, obtained by crystallization as above or simply by evaporation of the extraction solvent and an oil, can be further purified by countercurrent extraction, countercurrent distribution, or by partition chromatography. Fervenulin can be recrystallized from any of the solvents mentioned above particularly acetone, ethyl acetate, methylene chloride, methanol, ethanol, and preferably chloroform.

The whole beer can be filtered at a pH between 3 and 9, and preferably between pH 7–8. Ordinarily it will not be necessary to adjust the pH before filtering as the pH at the end of the fermentation will ordinarily be between pH 7 and pH 8. Extraction of the filtrate is advantageously effected at a pH between 3 and 7, preferably at about pH 6, because fervenulin though a neutral compound, tends to become degraded in alkaline solutions.

The purification of crystalline fervenulin can also be accomplished by sublimation at about 70° C. and 10 microns pressure.

Fervenulin exhibits a characteristic pattern given below with bioautographed papergrams. Location of zones is by bioautography with Klebsiella pneumoniae. The composition of the solvent systems (the remainder being water) and $R_f$ values are as follows:

(1) 81% n-butanol; $R_f=0.5$
(2) 81% n-butanol; 0.25%, p-toluene sulfonic acid; $R_f=0.5$
(3) 81% n-butanol, 2% piperidine; no zone
(4) 4% n-butanol; $R_f=0.75$
(5) 4% n-butanol; 0.25% p-toluene sulfonic acid; $R_f=0.75$ Fervenulin has a broad antimicrobial spectrum as exhibited by its activity against bacteria such as: Klebsiella pneumoniae, Escherichia coli, Aerobacter aerogenes, Salmonella paratyphi B, Salmonella typhosa, Salmonella pullorum, Salmonella schottmuelleri, Pasteurella multocida, Proteus vulgaris, Diplococcus pneumoniae, Streptococcus hemolyticus, Streptococcus viridans, Micrococcus aureaus, Micrococcus albus, Bacillus subtilis, Mycobacterium tuberculosis BCG, Mycobacterium avium, Streptococcus faecalis, Salmonella typhi, and Pseudomonas aeruginosa; against plant pathogenic bacteria such as: Agrobacter tumefaciens, Corynebacterium faciens, Erwinia amylovora, Corynebacterium michiganensis, Xanthomonas campestris, Xanthomonas malvacearum, Xanthomonas pelargoni, and Xanthomonas vesicatoria; against fungi such as: Histoplasma capsulatum, Blastomyces dermatitidis, Cryptococcus neoformans, Microsporum canis, Trichophyton interdigitale, Nocardia asteroides, Hormodendrum compactum, Phialophora verrucosa, Monosporium apiospermum, Sporotrichum schenckii, Coccidioides immitis, Geotrichum sp., and Microsporum andouini; and against protozoa such as Trichomonas foetus, Trichomonas vaginalis, and Entamoeba histolytica.

The following examples are illustrative of the process and products of the present invention, but are not to be construed as limiting. All percentages are by weight and all solvent mixture proportions are by volume unless otherwise noted.

EXAMPLE 1

A lyophilized culture of Streptomyces fervens, NRRL 2755, was used to seed the following sterile agar medium on tubed slants:

| | Grams |
|---|---|
| Maltose | 10 |
| Tryptone | 5 |
| K₂HPO₄ | 0.5 |
| NaCl | 0.5 |
| FeSO₄ | 0.1 |
| Agar | 20 |
| Deionized water to make 1 liter. | |

The slants were incubated for 7 days at 30° C., after which time sporulation was complete. The spores from the agar slants were used, in an aqueous suspension, to inoculate 100 milliliters of preseed medium in a 500 milliliter Erlenmeyer flask. The sterile preseed medium consisted of:

| | Grams |
|---|---|
| Cotton seed meal | 25 |
| Glucose | 40 |
| Tap water to make 1 liter. | |
| Adjusted to pH 7.2 before sterilizing. | |

The seed flask was incubated for 72 hours at 28° C. on a reciprocating shaker after which it was used as an inoculum for a 20 liter seed fermentor in the amount of approximately 3%. The 20 liter seed fermentor contained a sterile medium consisting of:

| | Grams |
|---|---|
| Glucose | 20 |
| Kay-soy¹ | 10 |
| Brewer's yeast | 2.5 |
| Ammonium chloride | 5 |
| Calcium carbonate² | 4 |
| Sodium chloride | 3 |
| Tap water to make 1 liter. | |

¹ Fat extracted soybean meal, finely milled.
² The calcium carbonate was added after the medium was adjusted to pH 7.2 and before sterilization.

The 20 liter seed fermentor was incubated for 48 hours at 28° C. and aerated at the rate of 6 standard liters or about 0.2 standard cubic foot (s.c.f.) of air per minute and agitated with a sweep stirrer. The 20 liter seed fermentor was used to inoculate 250 liters of the same medium in a 100 gallon fermentation tank. 900 milliliters of lard oil were added during the fermentation to control foaming. The tank was agitated with a propeller and aerated at the rate of 75 standard liters (about 2.6 s.c.f.) of air per minute. After 66 hours of fermentation the beer assayed 134 mcg./ml. (45 mcg./mg. on a dry basis) of fervenulin. The fervenulin present was then harvested as follows:

The whole beer was adjusted to pH 8.5 and filtered. The filtrate was adjusted to pH 6 and extracted with methylene chloride, 85 liters being used. The methylene chloride extract was concentrated to an oil by evaporation of the solvent. A sample, 20 grams, of the oil was dried on a porous plate to a solid residue. A sample, 1.5 grams, of the solid residue was dissolved in 100 ml. of chloroform and stirred with 1.5 grams of activated carbon for 45 minutes. The mixture was filtered and the chloroform was removed by evaporation to yield 394 mg. of yellow crystalline fervenulin, Preparation 1, which assayed 740 mcg./mg. of fervenulin.

Preparation 1 exhibited the following antibacterial spectrum demonstrating its activity against gram positive and gram negative bacteria and mycobacteria:

| Test organisms | Minimal inhibitory concentration (MIC) (mcg./ml.) |
|---|---|
| Bacillus subtilis | 2.5 |
| Micrococcus aureus | 1.0 |
| Streptococcus hemolyticus | 10.0 |
| Streptococcus viridans | 100.0 |
| Streptococcus faecalis | 100.0 |
| Diplococcus pneumoniae | 100.0 |
| Pasteurella multocida | 3.1 |
| Salmonella typhi | 25.0 |
| Proteus vulgaris | 100.0 |
| Escherichia coli | 50.0 |
| Pseudonomas aeruginosa | 100.0 |
| Aerobacter aerogenes | 25.0 |
| Salmonella schottmuelleri | 50.0 |
| Salmonella paratyphi B | 50.0 |
| Klebsiella pneumoniae | 25.0 |
| Mycobacterium tuberculosis bovis | 50.0 |
| Salmonella typhosa | 50.0 |
| Salmonella pullorum | 25.0 |
| Micrococcus albus | 100.0 | the following spectrum against plant pathogenic bacteria:

| Test organisms | MIC (mcg./ml.) |
|---|---|
| Agrobacter tumefaciens | 200 |
| Corynebacterium faciens | 100 |
| Erwinia amylovora | 200 |
| Corynebacterium michiganensis | 100 |
| Xanthomonas campestris | 200 |
| Xanthomonas malvacearum | 200 |
| Xanthomonas pelargoni | 200 |
| Xanthomonus vesicatoria | 200 | the following antifungal spectrum:

| Test organisms | MIC (mcg./ml.) |
|---|---|
| Nocardia asteroides | 1,000.0 |
| Blastomyces dermatitidis | 100.0 |
| Coccidioides immitis | ¹ 1,000.0 |
| Geotrichum sp. | 1,000.0 |
| Hormodendrum compactum | 1,000.0 |
| Cryptococcus neoformans | 100.0 |
| Histoplasma capsulatum | 10.0 |
| Sporotrichum schenckii | 1,000.0 |
| Monosporium apiospermum | 1,000.0 |
| Microsporum audouini | 100.0 |
| Microsporum canis | 100.0 |
| Trichophyton interidigitale | 100.0 |
| Phialophora verrucosa | 1,000.0 |

¹ 100.0 partial inhibition.

and the following antiprotozoal spectrum:

| Test organism | MIC (mcg./ml.) |
|---|---|
| Trichomonas foetus | 20 |
| Trichomonas vaginalis | 20 |

EXAMPLE 2

The slant and preseed were prepared and used following the procedure of Example 1. The preseed was used at the rate of 2% to inoculate 300 liters of seed medium (following the procedure of Example 1) in a fermentor tank. The seed tank was incubated for 60 hours at 28° C., agitated with a propeller, and aerated at the rate of 8 s.c.f. of air per minute. The seed was used to inoculate 5000 liters of the same culture medium prepared in a 2000 gallon fermentation tank. The fermentor was incubated at 28° C., agitated by a propeller at 166 r.p.m., and aerated at the rate of 80 s.c.f. of air per minute. The fervenulin activity (the whole beer assayed 120 mcg./ml. of fervenulin) in the whole beer was recovered after 42 hours of fermentation as follows:

The whole beer was adjusted to pH 8 and filtered. The clear filtrate was adjusted to pH 5.9 and extracted with methylene chloride. The methylene chloride extract was concentrated to an oil which was leached with upper phase of a solvent system consisting of acetone:n-hexane:water in the volume proportions 5:3:1, respectively. The leached extract was evaporated to yield crude fervenulin as a dark brown semicrystalline material. A sample, 815 grams, of this semicrystalline crude fervenulin was leached 6 times with a total of 400 milliliters of acetone, at Dry Ice temperature. The leached crystals were dissolved in 400 milliliters of solvent system consisting of ethyl acetate:acetone in the volume proportions 3:1, respectively, and stirred for 5 minutes with 3 grams of activated carbon. The mixture was filtered. The filtrate, a yellow solution, was evaporated under a stream of nitrogen to yield 6 grams of yellow crystalline fervenulin, Preparation 2a, which assayed 880 mcg./mg. of fervenulin. Preparation 2a was recrystallized from 150 ml. of acetone and 50 ml. of water to yield 3.5 grams of crystalline fervenulin, Preparation 2b, a brilliant yellow crystalline material which melted at 178–179° C., and assayed 1000 mcg./mg. of fervenulin. Preparation 2b gave negative ninhydrin, ferric chloride, Tollens', Benedict's, iodoform, bisulfite addition, Ehrlich-Pauly, biuret, Hinsberg, Ehrlich indole, Sakaguchi, creatinine, m-dinitro (Feigel) and neutral permanganate tests; a positive copper sulfide test for HCN; was stable for at least a week at pH 2.0 and 4° C.; was soluble in methanol, ethanol, acetone, chloroform, ethyl acetate, and 5% sodium bicarbonate; was soluble in cold water to about 2 mg./ml., in hot water to about 40 mg./ml.; and was insoluble in hydrocarbons. The material, Preparation 2b was stable to acid hydrolysis and was recovered intact after treatment with 6 N HCl on a steam bath for 40 hours.

EXAMPLE 3

A sample, 980 mg., of a material similar to Preparation 2a which assayed 900 mcg./mg. of fervenulin, was further purified by counter-current distribution, using the solvent system benezene:methanol:water in the volume proportions 1:1:0.2, respectively, through 216 transfers. A single color band was observed between tubes 80–115. The single weight peak occured in tube 99. The material, in tubes 90–103, was pooled and then evaporated to a dry crystalline residue. The crystalline residue was recrystallized from acetone and water to yield 450 mgs. of purse crystalline fervenulin, Preparation 3a, melting at 176°–178° C., assaying 1000 mcg./mg. of fervenulin and having the following elemental analysis:

Calculated for $C_7H_7N_5O_2$: C, 43.52; H, 3.65; N, 36.26; O, 16.56. Found: C, 43.83; H, 3.73; N, 35.99; O, 17.27. This analysis coupled with the molecular weight determination given in the following table indicates a molecular formula of $C_7H_7N_5O_2$:

| Method | Compound | Calculated | Found |
|---|---|---|---|
| X-Ray | $C_7H_7N_5O_2$ | 193.18 | 189 |
| Vapor pressure | $C_7H_7N_5O_2$ | 193.18 | 190 |
| Saponification | $C_7H_7N_5O_2$ | 193.18 | 186 |

The pure crystalline fervenulin is further characterized as follows:

The infrared spectrum, FIGURE 1, shows a complete absence of any absorption in the OH/NH region and exhibits characteristic absorption bands expressed in reciprocal centimeters at the following frequencies: 3040, 1718, 1675, 1575, 1535, 1495, 1435, 1415, 1397, 1296, 1255, 1219, 1115, 1085, 1044, 995, 962, 930, 884, 815, 740, 730, 709.

Figure 2:
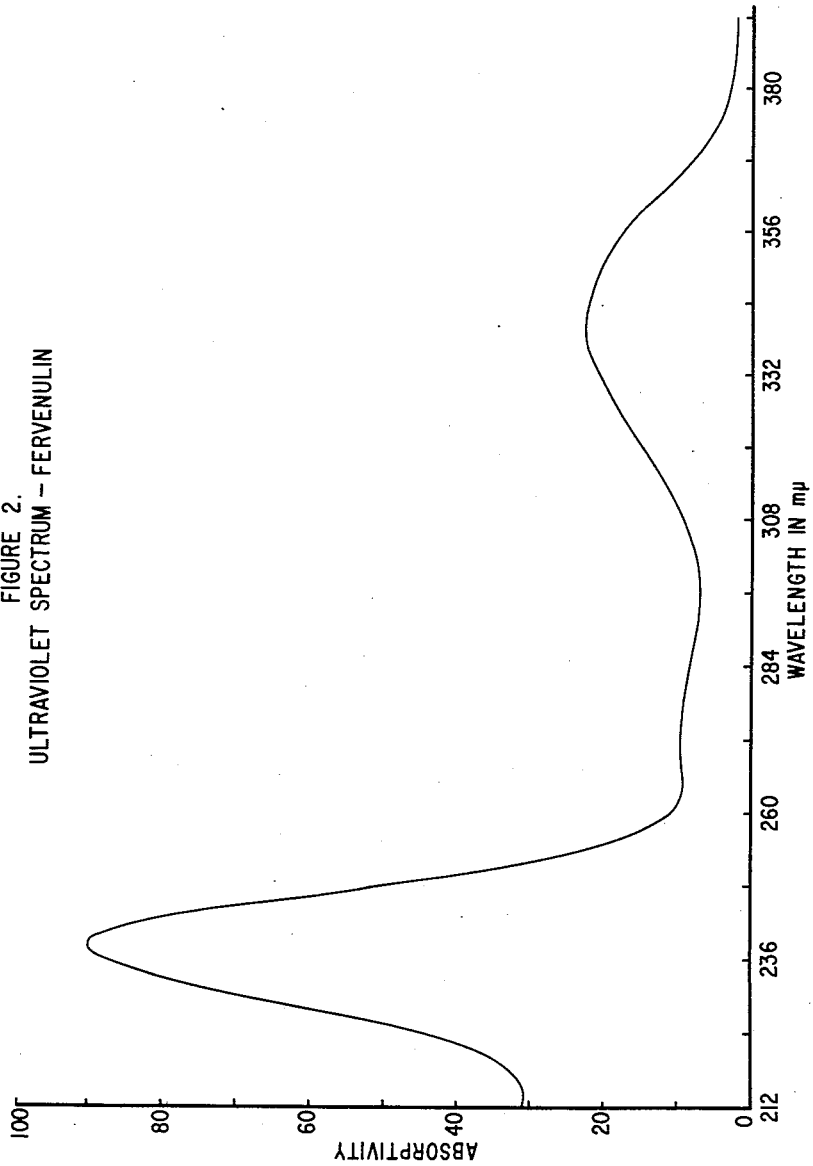

The ultraviolet spectrum, FIGURE 2, exhibits a maximum absorption at 239 m$\mu$ where (coefficient of extinction) $a=87$, a small maximum between 270–280 m$\mu$ where $a=8.5$–$9.0$ and a maximum at 340 m$\mu$ where $a=23$.

Crystallization from chloroform gives bright yellow crystals having the following properties:

| | |
|---|---|
| Melting point | 178–179° C. |
| Crystal system | Orthorhombic. |
| Crystal class | Rhombic dipyramidal. |
| Crystal habit | Lamellar. |
| Axial ratio | $a:b:c$, 0.883:0.316. |
| Unit cell dimensions | $a=15.86$ A. $b=17.96$ A., $c=5.667$ A. |
| Crystal density | 1.555. |
| Formula weights per cell | 8. |
| Molecular weight | 189. |
| Optic sign | Negative. |
| Dispersion | Extreme, $V>R$. |
| Optic axial angle | $2V=23°$ 30' (calc.). |
| Optic orientation | $b=X$, $c=Y$, $a=Z$. |
| Refractive indices (for sodium light) | $\alpha=1.584$, $\beta=1.706$, $\gamma=1.712$. |

Crystalline fervenulin also exhibits large negative birefringence, and sublimes readily at 70° C. and 10 microns' pressure.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A novel composition of matter assaying at least 4.5 mcg./mg. of the compound, fervenulin, which in its essentially pure crystalline form is characterized by a yellow orthorhombic crystalline form; by a melting point of 178–179° C.; by a molecular formula of $C_7H_7N_5O_2$; by solubility in methanol, ethanol, acetone, chloroform, ethyl acetate and water; by insolubility in hydrocarbon solvents; and by exhibiting characteristic infrared and ultraviolet absorption spectra as shown in the drawings, FIGURES 1 and 2, respectively.

2. Crystalline fervenulin, as defined in claim 1.

3. A novel composition of matter consisting essentially of fervenulin as defined in claim 1.

4. The process which comprises cultivating *Streptomyces fervens* in an aqueous nutrient medium under submerged aerobic conditions until substantial antibiotic activity is imparted to said medium.

5. The process which comprises cultivating *Streptomyces fervens* in an aqueous nutrient medium under aerobic conditions until substantial activity is imparted to said medium by production of fervenulin and isolating fervenulin from the culture medium, said fervenulin in its essentially pure crystalline form being characterized as in claim 1.

6. A process which comprises cultivating under aerobic conditions *Streptomyces fervens* in an aqueous nutrient medium at a temperature of about 18° C. to about 37° C. for a period between about 2 and about 10 days until substantial activity is imparted to said medium by production of fervenulin, separating the fervenulin from the culture medium and isolating fervenulin therefrom, said fervenulin in its essentially pure crystalline form being characterized as in claim 1.

7. The process of claim 5 which comprises isolating fervenulin from the culture medium by extraction with a water-immiscible solvent for fervenulin.

8. The process of claim 7 which comprises isolating fervenulin from the culture medium by extraction with a water-immiscible organic solvent for fervenulin selected from the group consisting of halogenated hydrocarbons, lower alkanols, lower alkanones, and lower alkyl esters.

9. The process of claim 8 wherein the halogenated hydrocarbon is methylene chloride.

References Cited in the file of this patent

UNITED STATES PATENTS 2,649,401    Haines et al. _____ Aug. 18, 1953

OTHER REFERENCES

Pridham et al.: Applied Microbiology, 1958, pp. 52–79, vol. 6.

De Boer et al.: Antibiotics Annual 1959–1960, pages 220–226; pub. 1960; pub. by Antibiotics, Inc. N.Y.C.

Eble et al.: Antibiotics Annual 1959–1960, pages 227–229; pub. 1960; pub. by Antibiotics, Inc., N.Y.C.

J. of Bacteriology, October 1956, page 4.

UNITED STATES PATENT OFFICE
CERTIFICATE OF CORRECTION

Patent No. 3,022,220                February 20, 1962

Clarence De Boer et al.

It is hereby certified that error appears in the above numbered patent requiring correction and that the said Letters Patent should read as corrected below.

Column 2, TABLE I, opposite "14." for "Insulin" read -- Inulin --; column 5, line 75, for "45 mcg./mg." read -- 4.5 mcg./mg. --; column 7, line 61, for "purse" read -- pure --; column 8, line 22, for "a:b:c, 0.883:0.316" read -- a:b:c, 0.883:1:0.316 --.

Signed and sealed this 19th day of June 1962.

(SEAL)
Attest:

ERNEST W. SWIDER
Attesting Officer

DAVID L. LADD
Commissioner of Patents